Jan. 20, 1953 M. BEYMER 2,626,367
WELDING GENERATOR
Filed Dec. 31, 1948 2 SHEETS—SHEET 1
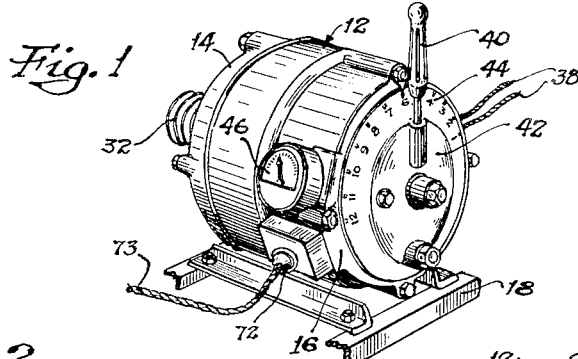
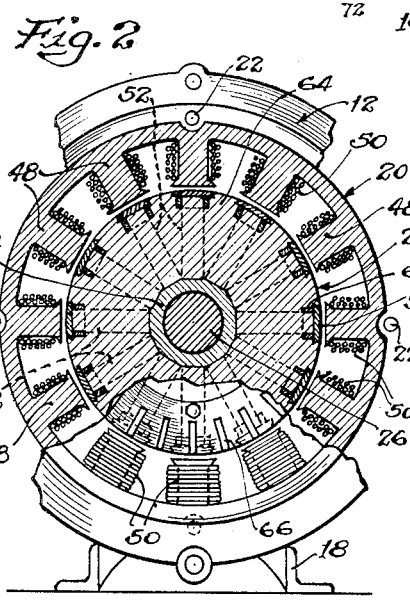
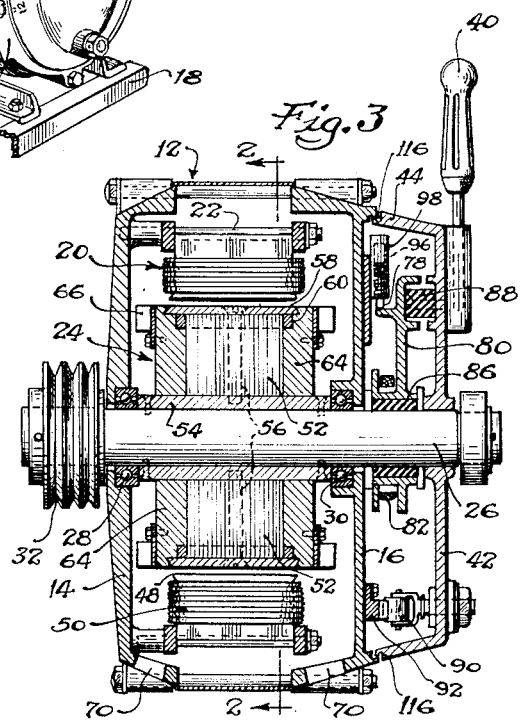
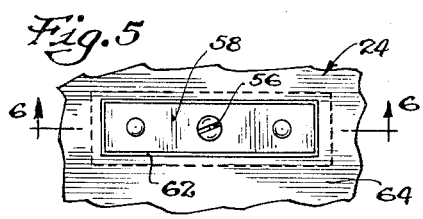
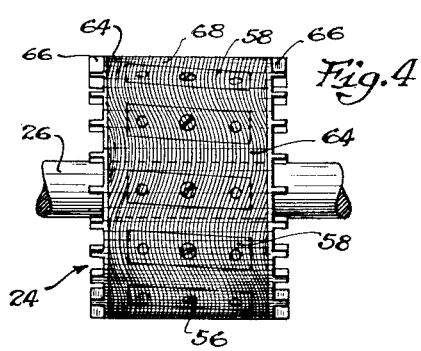
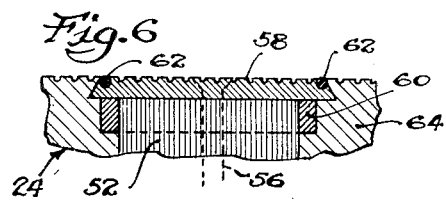
Inventor
Marshall Beymer
By Ferd Ong
Attorney

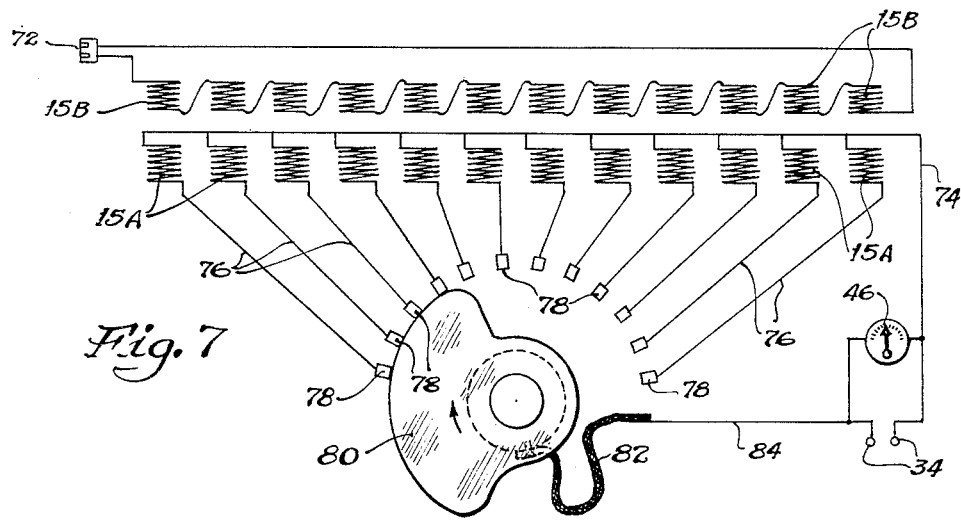
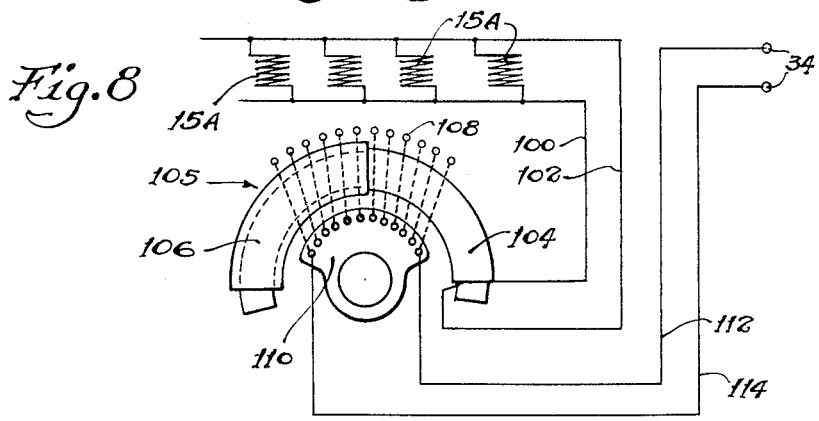
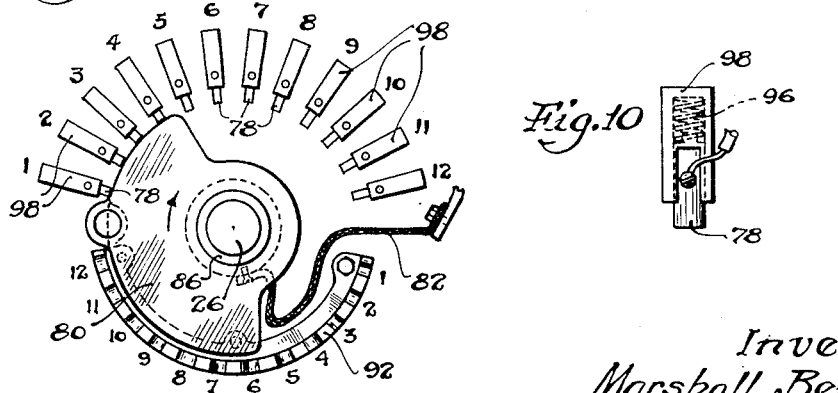

Patented Jan. 20, 1953

2,626,367

UNITED STATES PATENT OFFICE 2,626,367

WELDING GENERATOR

Marshall Beymer, Chicago, Ill., assignor of one-half to Henry L. Sweitz, Chicago, Ill.

Application December 31, 1948, Serial No. 68,687

4 Claims. (Cl. 310—156)

This invention relates to generators of the type adapted to furnish intermittent duty high-amperage currents, and it relates particularly to alternating current welding apparatus.

One of the simplest forms of generators is an alternating current machine which utilizes a permanent magnet rotor. This construction has a minimum number of moving parts. There are no commutator segments, brushes, slip rings or rotor coils nor direct current exciter devices with their own commutators, brushes, etc. Hence, the weight, size, cost and upkeep of the machine are relatively small. One objection to the use of permanent magnets, however, is their tendency to lose their magnetism with age, and the comparatively low flux density in proportion to their mass weight which is obtained when such magnets are used. Because of these disadvantages, welding machines generally have been of the direct-current type which utilizes a field winding that is energized by the machine itself or by a separate source. Direct-current welders have large numbers of rotating parts and all the attendant disadvantages thereof, but to date they have been considered as the most practical welders for most purposes.

Recently it has been found that alternating current, particularly when of a frequency higher than the standard 60 cycles, is better than direct current for welding in many situations. Along with this, there have been developed several types of iron alloys having high magnetic permeability which are capable of retaining said magnetism almost indefinitely. These factors alone, however, have not made alternating current welders of the permanent magnetic variety usable. It has been found that even the best of the available permanent magnet materials gradually lose magnetic flux lines of force when subjected to the enormous intermittent short-circuiting ampere drain of the stator collector system, which induces heavy eddy current reactions of a welding generator while under load. Auxiliary exciters are required to compensate for such loss of magnetism. These conditions are not encountered in a constant-potential electric light generator.

Accordingly, it is a primary object of this invention to make the use of a permanent magnet rotor feasible in an electric welder or other high-amperage, low-voltage generator, so as to derive all the advantages of such construction which have been listed above.

Another object is to prevent the eddy-current effects in the machine from their general tendency towards a depolarizing effect upon the permanent magnets.

A further object is to provide a practical alternating current welder which will be superior to the present electric welders that are on the market and which has superior operational characteristics in many instances, such as a complete elimination of objectionable magnetic arc blow; an unusually low percentage of slag impurities enclosures and gas porosities, also an elimination of undercutting and excessive splatter; all of which are present as undesirable factors to be contended with in direct-current potential arc welding procedure.

A still further object is to provide a dependable arc welding machine, well adapted for mass production, and readily usable by unskilled workmen who might have to use whatever welding rod that is available in any position without regard to direction of or polarity of welding potential.

Among the many features of the invention may be mentioned the unique arrangement for preventing depolarization of the permanent magnets in the rotor. These magnets are arranged radially about a central mounting member, and to the outer portion of each magnet is affixed a body of substantially non-magnetic material having high electrical conductivity, such as copper. This body may take the form of a copper band secured to the outer pole, a copper loop embedded in the pole shoe, or both. These copper bands and loops, in some way or other, possibly by concentrating into one closed circuit most of said eddy currents, serve to nullify the depolarizing effects of the eddy currents in the machine, enabling the permanent magnets to retain their magnetism substantially the same as though such eddy currents did not exist.

As another feature, the permanent magnet assembly is cast in a cylindrical body of light-weight, non-magnetic material such as aluminum which affords a rigid, strong rotor structure.

Another feature is the current-collecting means for selectively furnishing welding currents of various magnitudes. In one embodiment this comprises a pivoted contact sector cooperating with individual stator coil terminals, and in another embodiment it includes a variable high-cycle inductive reactance choke coil control assembly.

Still another feature is the provision of an auxiliary output circuit for supplying power to a substantially constant load, such as electric lights.

Other and further objects of the present invention will be apparent from the following description and claims and are illustrated in the accompanying drawings, which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is a front perspective view of an electric welding machine constructed in accordance with and embodying the invention;

Fig. 2 is a cross-sectional view of the machine, taken on the line 2—2 of Fig. 3;

Fig. 3 is a longitudinal section of the machine;

Fig. 4 is a partial plan view of the rotor;

Fig. 5 is a detail plan view of a pole face in the rotor;

Fig. 6 is a partial section of the rotor on the line 6—6 of Fig. 5;

Fig. 7 is a circuit diagram of the machine showing one form of current-collecting means;

Fig. 8 is a circuit diagram of another form of current-collecting means;

Fig. 9 is a simplified end view of the machine, showing the mechanical construction of the current selector and its cooperating contacts in the embodiment of Fig. 7; and Fig. 10 is a detail view of a current contact.

Referring now to Figs. 1, 2 and 3, the welding machine therein illustrated has a housing 12 with end bells 14 and 16 supported by a base 18. A stator 20 is mounted on the end bell 14 within the housing 12, being secured thereto by bolts 22. A rotor 24 is mounted on a shaft 26 which is journalled in bearings 28 and 30 carried by the end bells 14 and 16. A pulley 32 grooved to receive a multiple V-belt is secured on one end of the shaft 26. This pulley is belt-connected to the driving pulley of a motor or engine (not shown) which may likewise be mounted on the base 18. Widely spaced individual sockets or studs on the housing 12 receive plugs or lugs affixed to welding cables 38, which distribute the welding potential developed by the generator. The amount of current flow is regulated by a control handle 40 secured to a selector drum 42 which is rotatably mounted on the shaft 26. A dial 44 on the drum 42 cooperates with a suitable index on the housing 12 to indicate the setting of the current selector. A metering device 46, having a designed double scale, indicates voltages while welding is being done, on one scale, and revolutions per minute on the other scale when no welding is being done, enabling the operator to generate particular voltages for particular types of welding rod.

The stator 20, although represented in the drawings as solid material, actually is constructed of laminations in accordance with standard practice, having on the inner end of each pole of each lamination, shoes of a particular size and shape cut thereon for a particular purpose hereinafter set forth. A number of stator poles 48 extend radially inward toward the rotational axis (shaft 26) of the machine. Coils 50 are wound on the poles 48, and alternating voltages are induced in these coils by the rotating magnetic field of the rotor 24 when the machine is being operated. As will be explained subsequently, there are two sets of coils—one set being included in the welding circuit and the other set forming an auxiliary fixed-amperage winding for a lighting circuit or the like.

The rotor 24 is of essentially cylindrical configuration and comprises a plurality of permanent magnet bars 52 varying in accordance with definite frequency cycles and other desirable characteristics in the welding potential the generator is developed to produce. The magnet bars 48 are arranged with their magnetic axes disposed radially of the shaft 26 and are equally spaced around the rotor 24. The inner ends or poles of the bars 52 are engaged with a central mounting member in the form of a sleeve or quill 54 secured on the shaft 26. In assembling the rotor 26, the magnet bars 52 are secured to the quill 54 by bolts 56 or the like passed radially through the bars 52 and threaded into the quill 54. The outer ends or poles of the magnet bars 52 are of alternate north and south polarities. These bars are made of a high-quality permanent magnet alloy, such as iron alloys containing such metals as tungsten, aluminum, magnesium cadmium, nickel, cobalt or other suitable metals presently obtainable in the market. To the outer poles of the bars 52 are affixed pole shoes 58 (Figs. 2 to 6) of soft iron, which are fastened in place by the bolts 56. These pole shoes ordinarily afford a certain amount of magnetic leakage between the rotor poles in any electric generator which is also desirable in a welding machine tending to a smoother flow of electric potential desirable to hold a steady arc. However, in this device, the shoes are of a shape and so positioned, in relation to the shape of the shoes built into the pole ends 48 of the stator laminations, and their relation to the magnet bars upon which they are mounted, as to set up a controllable highly active turbulency in the molten mass in the weld pool.

It has been explained above that eddy-current effects normally tend to depolarize permanent magnets used in generators, especially where the load currents are heavy, as in welding applications. The eddy-currents set up conflicting magnetic fields and also produce heating of the magnets, both of which impair the usefulness of the magnets. To the end of reducing eddy-current effects in these magnets and making the same negligible, I have embodied certain members in the rotor structure to concentrate the eddy currents in parts of the rotor where they do substantially no harm, but may indeed intensify the number of magnetic flux lines of force at the head of the magnet by concentrating said eddy currents into a one-turn closed electrical circuit having its own polarity, increasing by that much the magnetic pull desired in each pole.

As best shown in Figs. 3 and 6, a copper body 60 is affixed to the outer pole of each magnet bar 52 at the junction of the bar 52 and the pole shoe 58. This body 60 consists of a closed band of copper which acts as a short-circuited one turn collector for the eddy currents. The bands 60 are secured to the bars 52 by brazing in the present instance. I am not prepared to advance a complete scientific explanation as to why these copper bands 60 function in the manner which they do, but I have observed that the rotor is much cooler and the magnetic pull, as recorded on the scale, seems to have greater value when they are employed than would otherwise be the case, and the tendency towards depolarization is reduced to a very low figure. I believe that the bands 60 have some form of shielding or concentrating effect which diverts most of the eddy currents from the magnet bars 52. Other materials may be used in place of copper, provided they are substantially non-magnetic and have high electrical conductivity. The fact that such materials likewise have high heat conductivity may account also for the effects which they produce, at least to some extent.

As a further aid in increasing the magnetic flux lines of force and intensifying same within selected areas, to promote high velocity of concentrated heavy-amperage field as the magnet poles 52 cross the faces of the stator poles 48, I find that use can be made of closed loops or turns 62, Figs. 5 and 6, of copper wire or the like which are embedded in the faces of the pole shoes 58. A rectangular groove is formed in each shoe 58, and the wire 62 is laid in this groove and bonded to the shoe 58. The wire 62 is brought flush with the pole shoe 58 when the rotor 24 is machined. The loops 62 contribute materially to concentration of magnetic lines of force where most needed.

To develop and control a certain desirable turbulency in the weld pool, for the purpose of throwing out slag enclosures, and gas pockets and eliminating undesirable splatter all so common in direct current arc welding that special reverse polarity welding rod is required in many cases, I have specially designed the positioning of the shoes 58 and bars 52 in relation to the stator pole shoes 48, from front to rear of the rotor axle. I therefore have imparted a slight skew angle to the magnet bars 52 from front to rear of the rotor axis, as best indicated by the positions of the pole shoes 58 in Fig. 4. This angle of skew also results in smoother rotation of the rotor 24 in generators of the 60 cycle type.

For making the rotor structure strong and rigid, the assembled magnet bars 52 are cast in a mass of any light-weight, non-magnetic metal. The said metal fills the spaces between the magnets and bonds itself to the other parts of the rotor and has some value as to dissipation of eddy currents between magnets. Fan blades 66 are secured to the ends of the rotor 24 so that a cooling air draft is caused to flow across the surface of the rotor when the machine is operating. The rotor 24 is machined to the correct diameter, and serpentine grooves 68, Fig. 4, are cut into the surface thereof as a further aid in breaking up peripheral surface eddy currents, thus further cooling off the rotor. Ventilator openings 70, Fig. 3, are provided in the end bells 14 and 16 for passage of the cooling air into and out of the housing 12.

As the rotor 24 turns, it sweeps the magnetic fields of the rotor poles 58 successively across the stator coils as 15, inducing electric potential in these coils. Referring to Fig. 7, the stator coils 15 are arranged in two sets, 15A and 15B, which respectively supply currents to the welding cables 38 (Fig. 1) and to a substantially fixed-kilowatt load such as electric lamps. The coils 15B are connected in series to the terminals of a bayonet type socket 72 mounted on the machine frame, which socket receives a plug on a cable 73 (Fig. 1). The coils 15A are adapted to be wound and placed in a parallel circuit, in varying numbers, depending upon the amperage desired. A conductor 74 connects one terminal of each coil 15A to one of the terminals or studs 34 to which the welding load is affixed, and also to one terminal of the meter 46. The other terminals of the coils 15A are respectively connected by conductors 76 to contacts 78 which are arranged in a semi-circle. A contact sector 80 is cooperable with the contacts 78 to place selected numbers of the stator coils 15A in the welding circuit according to amperage requirements. As the sector 80 is moved clockwise, Fig. 7, it engages an increasingly larger number of the contacts 78. A flexible cable 82 connects the sector 80 to a conductor 84 in an ever shortening wrapping action which leads to a second terminal 34 and to a terminal of the meter 46.

The mechanical construction of the current-collecting means schematically shown in Fig. 7 is illustrated in Figs. 3, 9 and 10. The sector 80 is mounted on an insulating bushing 86 so that it is independent of the shaft 26. An insulating member 88 connects the sector 80 to the selector drum 42, which is adjusted to a desired position as 1, 2, 3, etc., by the control handle 40. The drum 42 is journalled on the shaft 26 and is yieldably held in its adjusted position by a detent roller 90 cooperating with teeth 92 on the end bell 16. The contact plungers or fingers 78 are fastened to springs 96 in the holders 98 which are mounted on the end bell 16 in insulated relation thereto. The springs 96 press the contacts 78 into engagement with the contact periphery of the sector 80. The greater the number of contacts 78 engaged by the sector 80, the heavier will be the current furnished to the welding load, and due to the wrapping action of 82, the electrical resistance decreases as the amperage load is increased.

A modified current-collecting means is shown in partially schematic fashion in Fig. 8. All of the stator coils 15A are connected in parallel by conductors 100 and 102 to the primary 104 of a variable high cycle inductive reactance choke coil assembly 105. A tubular shield 106 is disposed near one end of the primary 104 between this primary and the secondary 108, which encircles both 104 and 106. The secondary 108 is mounted on a pivoted support 110 so that it may be swung to various positions in accordance with load requirements. When in the extreme left-hand position, as viewed in Fig. 8, the secondary 108 is shielded by the sleeve 106 so that minimum welding potential voltage is induced therein. When in the right-hand position, maximum welding potential is induced in 108. Between these two positions a smooth variation of amperage and voltage are obtainable by rotating the support 110. Certain welding jobs require very fine adjustment of amperage, and in such instances the embodiment of Fig. 8 is preferable to that shown in Fig. 7, which adjusts the amperage in discrete steps.

The welder is apt to be used outdoors or in other locations where it is exposed to falling water, as rain. It is essential that no water enter the interior of the selector drum 42. To this end, a drainage groove 116, Fig. 3, is formed in the joint between drum 42 and the end bell 16. This groove 116 diverts the water to the bottom of the outside surface of the drum 42, and from there through an opening to the outside of the unit keeping the selector contacts dry.

The disclosed welder may be operated in either direction and at any predetermined frequency. Generally, a frequency of 360 cycles per second is preferred for welding. By appropriate design it is possible also to have several welding circuits fed by the generator. There are no parts which would require replacement in the rotor. The magnet bars retain their magnetism indefinitely under the conditions which exist in the machine, and there are no commutator parts to contend with. The generator operates at exceptionally high efficiency and rating. Both the bands 60 and the loops 62 act as short-circuiting turns for the eddy currents in the rotor. The prevention of depolarization is performed primarily by the bands 60. The loops 62 serve primarily to control the amount of flux leakage and to concentrate the bulk of the flux where needed. The skew angle of the pole shoes, in conjunction with the other factors mentioned, gives a weld of proper turbulency to eliminate gas pockets and impurities. A certain amount of flux leakage is desirable, and this is afforded by the shaping of both the rotor and stator pole shoes, as explained above, so that a steady arc can be maintained even though the aforesaid turbulency exists.

From the foregoing description it will be appreciated that I have provided an electric welder which fulfills the above-stated objects of the invention. This machine is a vast improvement over direct-current welders, with their multitudinous parts and expensive replacement problems, and a great many alternating current welders of the 60 cycle variety. While several preferred embodiments have been disclosed, the invention is not limited thereby, but embraces all other modifications coming within the scope of the appended claims.

I claim:

1. In an alternating current machine adapted to furnish high-amperage, low-voltage current, such machine including a stator having an even plurality of coils arranged in parallel, a rotatable shaft extending through the machine, a rotor on said shaft for causing a high-amperage, low-voltage current to be induced in said coils, said rotor having the same number of magnetic members as there are coils and adapted to rotate in phase with said coils and being of alternating polarity, and a current control device for rendering any selected number of said coils effective to furnish current, said control device including a plurality of arcuately arranged stationary contacts respectively connected electrically to said coils, and a contact sector rotatably mounted on said shaft and engageable with any selected number of said contacts for determining the number of said coils rendered effective.

2. A rotor adapted to furnish a moving magnetic field for exciting the stator of an alternating current generator to produce high amperage currents, such rotor comprising a central mounting member, a plurality of permanent magnetic members arranged in angularly spaced radial relation on said mounting member, with one pole of each magnetic member being adjacent to said mounting member and the other pole thereof being remote from said mounting member, and a body of light-weight, non-magnetic metal on said mounting member filling the spaces between said magnetic members, each of said magnetic members including thereabout a body of substantially non-magnetic material having high electrical conductivity for rendering negligible the tendency of said magnetic member to become depolarized and a second non-magnetic body of good conductive material embedded in the outer end face of the magnetic member, said body embracing the major area of the end face of said first named body.

3. A rotor adapted to furnish a moving magnetic field for exciting the stator of an alternating current generator, such rotor comprising a central mounting member, and a plurality of magnetic members arranged in angularly spaced radial relation on said mounting member, each of said magnetic members including a permanent magnet bar disposed with one pole thereof adjacent to said mounting member and the other pole thereof remote from said mounting member, a body of copper affixed to the outermost portion of said magnet bar to prevent depolarization of said magnet bar, and a non-magnetic conductor embedded in the outer pole face of each magnetic member, each conductor embracing the major area of each copper body.

4. A rotor adapted to furnish a moving magnetic field for exciting the stator of an alternating current generator, said rotor comprising a central mounting member, a plurality of permanent magnetic bars secured to said mounting member in angularly spaced radial relation, a grooved soft iron pole shoe affixed to the outermost pole of each of said magnet bars, a copper band disposed at the juncture of each magnet bar and pole shoe, and a one-turn secondary band mounted in the groove in each shoe and embracing the major area of each shoe.

MARSHALL BEYMER.

REFERENCES CITED

The following references are of record in the file of this patent:

UNITED STATES PATENTS

| Number | Name | Date |
|---|---|---|
| 571,270 | Kelly | Nov. 10, 1896 |
| 781,968 | Sachs | Feb. 7, 1905 |
| 1,739,136 | Gay | Dec. 10, 1929 |
| 1,782,262 | Gay | Nov. 30, 1930 |
| 1,942,123 | Reis | Jan. 2, 1934 |
| 2,018,646 | Caputo | Oct. 22, 1935 |
| 2,078,805 | Merrill | Apr. 27, 1937 |
| 2,230,008 | Nowosielski | Jan. 28, 1941 |
| 2,269,651 | Crocker | Jan. 13, 1942 |
| 2,374,930 | Gray | May 1, 1945 |
| 2,407,883 | Jackson | Sept. 17, 1946 |
| 2,485,474 | Brainard | Oct. 18, 1949 |
| 2,516,901 | Morrill | Aug. 1, 1950 |